(12) United States Patent
Nekoui et al.

(10) Patent No.: US 8,094,751 B2
(45) Date of Patent: Jan. 10, 2012

(54) SYSTEM AND METHOD FOR ENCODING AND DECODING OF SPACE-TIME BLOCK CODES IN DATA COMMUNICATION

(76) Inventors: Ehsan Nekoui, Kerman (IR); Siamak Talebi-Rafsanjan, Kerman (IR); Azim Rivaz, Kerman (IR)

( * ) Notice: Subject to any disclaimer, the term of this patent is extended or adjusted under 35 U.S.C. 154(b) by 299 days.

(21) Appl. No.: 12/510,984

(22) Filed: Jul. 28, 2009

(65) Prior Publication Data

US 2011/0026629 A1   Feb. 3, 2011

(51) Int. Cl.
  *H04L 27/00*   (2006.01)
(52) U.S. Cl. ......................................... 375/299; 375/267
(58) Field of Classification Search .......... 375/259–260, 375/267, 295, 299
  See application file for complete search history.

(56) References Cited

U.S. PATENT DOCUMENTS

| | | | | |
|---|---|---|---|---|
| 5,479,448 | A * | 12/1995 | Seshadri | 375/267 |
| 6,058,105 | A * | 5/2000 | Hochwald et al. | 370/310 |
| 6,088,408 | A * | 7/2000 | Calderbank et al. | 375/347 |
| 6,178,196 | B1 * | 1/2001 | Naguib et al. | 375/148 |
| 6,185,258 | B1 | 2/2001 | Alamouti et al. | |
| 6,430,231 | B1 * | 8/2002 | Calderbank et al. | 375/295 |
| 6,661,856 | B1 * | 12/2003 | Calderbank et al. | 375/347 |
| 7,184,488 | B2 * | 2/2007 | Papadias et al. | 375/295 |
| 7,215,718 | B1 * | 5/2007 | Calderbank et al. | 375/299 |
| 7,430,244 | B2 * | 9/2008 | Chung et al. | 375/267 |
| 7,469,015 | B2 * | 12/2008 | Le Nir et al. | 375/267 |
| 2006/0116155 | A1 * | 6/2006 | Medvedev et al. | 455/522 |
| 2006/0140294 | A1 * | 6/2006 | Hottinen et al. | 375/260 |
| 2009/0231991 | A1 * | 9/2009 | Ahn et al. | 370/208 |

OTHER PUBLICATIONS

Moghadam, et al., *Algorithms for the Inverse Eigenvalue Problem Concerning Jacobi Matrices and T-matrices*, Southeast Asian Bulletin of Mathematics, vol. 31, (2007); pp. 111-118.
Tarokh et al.; Space-Time Codes for High Data Rate Wireless Communication: Performance Criterion and Code Construction; IEEE Transactions on Information Theory; Mar. 1998; pp. 744-765; vol. 44; No. 2.
Wang et al.; Upper Bounds of Rates of Space-Time Block Codes from Complex Orthogonal Designs; ISIT; 2002; p. 303.
Vikalo et al.; On the Sphere-Decoding Algorithm II. Generalizations, Second-Order Statistics and Applications to Communications; IEEE Transactions on Signal Processing; Aug. 2005; pp. 2819-2834; vol. 53, No. 8.

* cited by examiner

*Primary Examiner* — Jean B Corrielus
(74) *Attorney, Agent, or Firm* — Christie, Parker & Hale LLP.

(57) ABSTRACT

A wireless data communication system. The system includes: a transmitter having a unitary rotation matrix processor for processing incoming information data stream and outputting a plurality of transmission symbols; an encoder for encoding the plurality of transmission symbols; M number of mapper units for mapping the symbols outputted from the encoder into a two dimensional constellation having M data symbols, where M is an integer greater than 1; M number of pulse shaper units to modulate the respective signals from the two dimensional constellation; and M number of antennas to transmit the M data symbols in M time slots. Each antenna transmits a respective symbol from the M symbols in a respective time slot of the M time slots and the encoder is configured to determine which symbol to be transmitted from each antenna in each time slot.

11 Claims, 8 Drawing Sheets

SYSTEM AND METHOD FOR ENCODING AND DECODING OF SPACE-TIME BLOCK CODES IN DATA COMMUNICATION

FIELD OF THE INVENTION

The present invention relates to wireless communication, and more particularly to system and method for effective wireless transmission in the presence of channel fading.

BACKGROUND

The most common technique for removing the effect of fading in the received signal of a wireless radio channel is to mitigate the effect of fading at the transmitter by controlling the transmitter's power using precoding. Thus, if the channel coefficients are known at the transmitter then the transmitter can change the transmitted signal power to overcome the effect of the channel fading at the receiver. There are two main problems with this solution. The first is increasing the dynamic range of transmitter by this solution and the second is that the transmitter does not have any knowledge of the channel as known by the receiver (except time division duplex systems, where the transmitter receives power from another known transmitter over the same channel).

Another approach against fading effects was disclosed by Alamouti et al (U.S. Pat. No. 6,185,258), titled "Transmitter Diversity Technique for Wireless Communication," the entire contents of which are hereby expressly incorporated herein. In this disclosure, an arrangement with two transmit antennas can be realized that provides diversity with bandwidth efficiency, easy decoding at the receiver (merely linear processing), and performance that is the same as the performance of maximum ratio combining arrangements. This approach also uses maximum ratio combiner as linear maximum likelihood receiver. The rate of these codes which are named orthogonal codes is less than one but have good performance in the fading channels than 2 antennas but this structure suffers from low transitions rate. However, for more than two antennas, the orthogonal code's rate can not exceed 3/4 see also Wang, H. and Xia, X.-G. Upper bounds of rates of space-time block codes from complex orthogonal designs. *IEEE Trans. on Information Theory*, 49(10): October 2003, 2788-96, the entire contents of which are hereby expressly incorporated herein.

Consider a space time code X, uses M antenna for transmission of M symbols in M time slot such as:

$$C = \begin{bmatrix} c_{11} & c_{12} & \cdots & \cdots & c_{1M} \\ c_{21} & c_{22} & \cdots & \cdots & c_{2M} \\ \vdots & \vdots & \ddots & & \vdots \\ \vdots & \vdots & & \ddots & \vdots \\ c_{M1} & c_{M2} & \cdots & \cdots & c_{MM} \end{bmatrix}$$

where $C_{ij}$ is the transmitted symbol from ith antenna in jth time slot.

In "Space-time codes for high data rate wireless communication: performance analysis and code construction." *IEEE Trans. on Information Theory*, 44: March 1998, 744-65, the entire contents of which are hereby expressly incorporated herein. Tarokh et al proposed some criteria for design of space-time codes. For any two codewords C≠C', the rank criterion suggests that the error matrix D(C,C')=C−C' has to be full rank. The proposed structure provides space-time codes with rate equal to 1 and 2 for arbitrary number of transmit antennas. Therefore, this structure has higher transitions rate than the mentioned methods. However, since the proposed code does not have an orthogonal structure in the receiver side, a linear optimum receiver effectively can not be implemented.

Therefore, there is a need for a non-orthogonal structure, which use a sphere decoder for optimum decoding. When the transmission rate is 1 and 2 the code does not require QR decomposition and it also benefits from low complexity suboptimum decoders.

SUMMARY

In some embodiments, the present invention is a space time block code (STBC) transmitter with a rate equal to one and two. In some embodiments, only one receive antenna at the receiver side is needed. The (block) code of the present invention has a reduced complexity suboptimum and maximum likelihood receiver, which make it suitable for improving the performance of fixed and mobile wireless communication systems.

In some embodiments, the present invention is a transmitter for wireless data communication. The transmitter includes: a unitary rotation matrix processor for combining incoming information data stream and outputting a plurality of transmission symbols; an encoder for encoding the plurality of transmission symbols; M number of mapper units for mapping the symbols outputted from the encoder into a two dimensional constellation having M data symbols, where M is an integer greater than 1; M number of pulse shaper units to modulate the respective signals from the two dimensional constellation; and M number of antennas to transmit the M data symbols in M time slots, wherein each antenna transmits a respective symbol from the M symbols in a respective time slot of the M time slots. The encoder is configured to determine which symbol to be transmitted from each antenna in each time slot.

In some embodiments, the present invention is a wireless data communication system. The system includes: a transmitter having a unitary rotation matrix processor for processing incoming information data stream and outputting a plurality of transmission symbols; an encoder for encoding the plurality of transmission symbols; M number of mapper units for mapping the symbols outputted from the encoder into a two dimensional constellation having M data symbols, where M is an integer greater than 1; M number of pulse shaper units to modulate the respective signals from the two dimensional constellation; and M number of antennas to transmit the M data symbols in M time slots. Each antenna transmits a respective symbol from the M symbols in a respective time slot of the M time slots and the encoder is configured to determine which symbol to be transmitted from each antenna in each time slot. The system further includes a receiver for receiving the transmitted data.

A receiver with one antenna may include a Zero Force (ZF) equalizer and may be configured to decode the transmitted data without computing a direct inversion of the channel matrix. A receiver with one antenna may include one antenna and an MMSE equalizer. The receiver with one antenna may include a sphere decoder and may be configured to decode the transmitted data without QR decomposition. A receiver with one antenna may include one antenna and a sphere decoder for computing a Cholesky decomposition matrix to decrease computational complexity.

The multi antenna receiver may include a sphere decoder and may be configured to decode the transmitted data without QR decomposition for symbol rates 1 and 2. The multi antenna receiver may include recursive receivers to decode the transmitted data for symbol rates 1 and 2.

DETAILED DESCRIPTION

Figure 1:
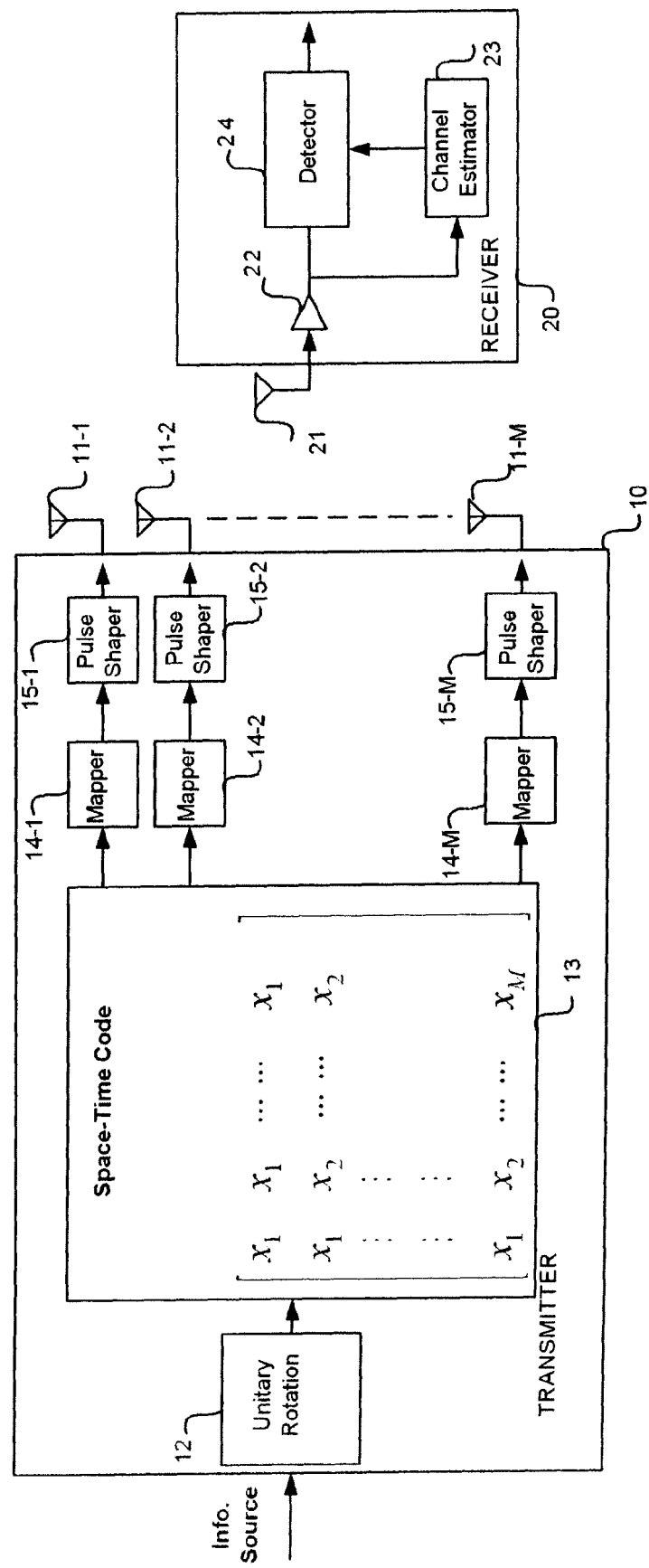
FIG. 1 is a block diagram of a transmitter with rate=1 and M antennas and a receiver with 1 antenna, according to some embodiments of the present invention.

In some embodiments, the present invention is a data transmitter comprising M antennas that uses M time slots, one for each antenna to transmit data at a rate of R (symbols per second), with RM symbols using a so-called T matrix transmission structure. In other words, the present invention incorporates a special structure for transmission of RM symbols from M antennas in M time slots. This structure results in a lower triangular r-stochastic channel matrix, which simplifies the optimum and sub-optimum receiver structures for single and multi antenna receivers.

In some embodiments, the transmitter uses space-time block code and is capable of working with arbitrary number of transmit and receive antennas. First, the transmitted data is multiplied by a proper unitary matrix to obtain the transmitted symbols. This unitary rotation guarantees full diversity. Then the symbols are transmitted using a special structure called T transmission. It is worth mentioning that this structure converts the equivalent channel matrix at each receiver antenna to a lower triangular r-stochastic matrix which has a great importance in simplification of the receiver structure. In the case of only one receive antenna, low complexity suboptimum receivers are applicable. A ZF receiver may be implemented without direct matrix inversion and a MMSE receiver has low computational complexity due to product of low triangular matrices. The optimum receiver, Sphere Decoder, in both cases of single and multi receive antennas is simplified either in QR or Cholesky decompositions. In some embodiments, the complexity of Sphere Decoder in multi receive antenna case is substantially decreased.

Data here represents physical data, such as information embedded in communication signals and symbols, etc. The physical data is then transformed to various forms to represent process and communicate the transformed physical data in a more effective manner. Different embodiments of the present invention perform one or more of the processes and steps discussed in detail below by one or more integrated chips, general or specific purpose processors, with specialized firmware or software. For example, each receiver or transmitter, or any internal blocks thereof may be implemented in hardware, software and/or firmware. The system and method of the present invention is applicable to fixed and mobile wireless communication systems, among others.

In some embodiments, when the transmission rate is one and the receiver employs one antenna, the channel matrix H, would change into a lower triangular r-stochastic matrix. In some embodiments, when a receiver with one antenna employs Zero Force (ZF) equalizer, there is no need to use the direct inversion of the channel matrix that normally would be in the order of $N^3$.

As one skilled in the art would know, a space-time code is a set of metrics which are used for data transmission in multi antenna systems. Each matrix is assigned to a specific set of symbols. The number of matrix columns is equal to number of time slots used for transmission and number of rows is equal to number of transmit antennas. For example, consider a space-time code $C_{n \times m}$. This code uses m time slots and n antennas for data transmission and in the jth time slot $C_{ij}$ is transmitted from ith antenna.

A T matrix is defined as a family of four square matrices constructed based on a vector t, as follows:

$$t = [t_1, t_2, \ldots, t_M]^T$$

$$T = \begin{bmatrix} t_1 & t_1 & \ldots & \ldots & t_1 \\ t_1 & t_2 & \ldots & \ldots & t_2 \\ \vdots & \vdots & \ddots & & \vdots \\ \vdots & \vdots & & \ddots & \vdots \\ t_1 & t_2 & \ldots & \ldots & t_M \end{bmatrix}$$

$$T_{zi} = T_{jz} = t_z \text{ for all } i, j \geq z,$$

or:

$$T = \begin{bmatrix} t_1 & \ldots & \ldots & t_1 & t_1 \\ t_2 & \ldots & \ldots & t_2 & t_1 \\ \vdots & & \ddots & \vdots & \vdots \\ \vdots & \ddots & & \vdots & \vdots \\ t_M & \ldots & \ldots & t_2 & t_1 \end{bmatrix}$$

$$T_{zi} = T_{j(M+1-z)} = t_z \text{ for all } i \leq M+1-z \text{ and } z-1 < j,$$

or:

$$T = \begin{bmatrix} t_1 & t_2 & \ldots & \ldots & t_M \\ \vdots & \vdots & & \ddots & \\ \vdots & \vdots & \ddots & & \vdots \\ \vdots & t_2 & \ldots & \ldots & t_2 \\ t_1 & t_1 & \ldots & \ldots & t_1 \end{bmatrix}$$

$$T_{iz} = T_{(M+1-z)j} = t_z \text{ for all } i \leq M+1-z \text{ and } z-1 < j,$$

or:

$$T = \begin{bmatrix} t_1 & \ldots & \ldots & t_{M-1} & t_M \\ \vdots & \ddots & & t_{M-1} & t_M \\ \vdots & & \ddots & \vdots & \vdots \\ t_{M-1} & \ldots & \ldots & t_{M-1} & \vdots \\ t_M & \ldots & \ldots & t_M & t_M \end{bmatrix}$$

$$T_{zi} = T_{jz} = t_z \text{ for all } i, j \leq z$$

which are simply rotation of each others. It worth mentioning that a T matrix is full rank if:

1—$t_i \neq 0$ $1 \leq i \leq M$, and

2—$t_1 \neq t_2 \neq t_3 \neq \ldots \neq t_n$.

See, for example, M. Mohseni Moghadam, A. Rivaz, "Algorithms for the Inverse Eigenvalue Problem Concerning Jacobi Matrices and T matrices", Southeast Asian Bulletin of Mathematics (SIAM)", Vol. 31, Pages: 111-118, 2007, the entire contents of which are hereby expressly incorporated herein, for more details. For describing receivers' structures throughout this disclosure, the first matrix of this family is considered; however, the results are valid for all the T family members.

FIG. 1 presents a space time transmitter with M antennas 11-1 to 11-M, according to some embodiments of the present invention. Here; the incoming information symbol stream passes through a unitary rotation matrix 12 and then an encoder 13 is applied to the information symbols. The encoder 13 outputs are applied to M mappers 14-1 to 14-M. The mappers map the symbols into a two dimensional constellation and then M pulse shapers 15-1 to 15-M modulate the respective signals and apply them to M transmit antennas 11-1 to 11-M. The transmitter uses M antennas and M time slots to transmit M data symbols. As we know a space time code rate is defined as:

$$R = \frac{\text{Number of Transmitted Symbols}}{\text{Number of Time Slots Used for Transmission}},$$

therefore, the transmissions rate is 1.

In order to transmit M data symbols $s_1, s_2, \ldots, s_M$, the transmitter first constructs a vector S using symbols $S=[s_1, s_2, \ldots, s_M]^T$ and then Vector S is multiplied by a unitary matrix U to produce vector X of transmitted symbols ($X=[x_1, x_2, \ldots, x_M]^T$).

$$X = US \quad (1)$$

More detailed conditions on U which guarantees full diversity is discussed later.

The transmitter uses a special transmission matrix $X_c$, which can be represented as:

$$X_c = \begin{bmatrix} x_1 & x_1 & \ldots & \ldots & x_1 \\ x_1 & x_2 & \ldots & \ldots & x_2 \\ \vdots & \vdots & \ddots & & \vdots \\ \vdots & \vdots & & \ddots & \vdots \\ x_1 & x_2 & \ldots & \ldots & x_M \end{bmatrix} \quad (2)$$

$s_1, s_2, \ldots, s_M$ are discrete random variables taking value from Q[i] (ring of quotient numbers). Therefore $X_c$ has different entries due to different values of $s_1, s_2, \ldots, s_M$. Now, assume that $s_i$ takes p different values, so there are $p^M$ different code matrices. A space time code achieves full diversity if the difference of each two distinct code matrices be full rank The proposed space-time achieves full diversity, if the unitary matrix, U, has the following structure:

$$U = W^*B$$

where, $B = \text{diag}(\beta_1, \beta_2, \ldots, \beta_n)$ $$W = \begin{bmatrix} w_{11} & w_{12} & \ldots & \ldots & w_{1M} \\ w_{21} & w_{22} & \ldots & \ldots & w_{2M} \\ \vdots & \vdots & \ddots & & \vdots \\ \vdots & \vdots & & \ddots & \vdots \\ w_{M1} & w_{M2} & \ldots & \ldots & w_{MM} \end{bmatrix}$$

where $\beta_1, \beta_2, \ldots, \beta_n$ are n numbers that do not satisfy the following equation:

$$a_1\beta_1 + a_2\beta_2 + \ldots + a_n\beta_n = 0 \{a_1, a_2, \ldots, a_n\} \in Q[i]^*$$

or satisfy the following relation:

$$a_1\beta_1 + a_2\beta_2 + \ldots + a_n\beta_n \neq 0 \{a_1, a_2, \ldots, a_n\} \in Q[i]$$

and W is a unitary matrix which in each of its columns, all entries have different nonzero values:

$$(w_{pj} - w_{lj}) \in Q[i] \neq 0 p \neq l, 1 \leq j \leq M^*$$

Now, consider two arbitrary code matrixes $X_c, X'_c$ made by $X, X'$ from $S=[s_1, s_2, \ldots, s_M]^T$, $S'=[s'_1, s'_2, \ldots, s'_M]^T$ respectively. We will define difference matrix by $D(X_c, X'_c)$ and it is shown that the difference matrix is not full rank if and only if $X_c = X'_c$.

$$D(X_c, X'_c) = X_c - X'_c$$

$D(X_c, X'_c)$ is a T matrix made by vector $D(X, X')$:

$$D(X, X') = X - X' = WB(S - S')$$

$D(X_c, X'_c)$ is full rank if:

1—All entries of vector X–X' are nonzero, and
2—Each entry of vector X–X' has a different value from other entries.

The zth element of X–X' can be expressed by:

$$(X - X')_z = \sum_{p=1}^{M} w_{zp}\beta_p(S - S')_p =$$

$$w_{z1}\beta_1(S - S')_1 + w_{z2}\beta_2(S - S')_2 + \ldots + w_{zM}\beta_M(S - S')_M$$

Assume $(X - X')_z$ is equal to zero. Since $\beta_1, \beta_2, \ldots, \beta_n$ do not satisfy any linear equation with coefficients in Q[i] this assumption is correct when only all the coefficients of $\beta_1, \beta_2, \ldots, \beta_n$ are zero in the above relation. On the other hand, all entries of matrix W are nonzero, therefore, we have:

$$(S - S')_p = 0 \quad 1 \leq p \leq M$$

which means S and S' are the same. As a result, entries of X–X' are zero when X=X'.

The next step is to show that $(X-X')_z$ and $(X-X')_l$ are not equal if $z \neq l$.

$$(X - X')_z - (X - X')_l =$$

$$\sum_{p=1}^{M}(w_{zp} - w_{lp})\beta_p(S - S')_p = (w_{z1} - w_{l1})\beta_1(S - S')_1 +$$

$$(w_{z2} - w_{l2})\beta_2(S - S')_2 + \ldots + (w_{zM} - w_{lM})\beta_M(S - S')_M$$

Assume $(X-X')_z \cdot (X-X')_l$ is equal to zero. Since $\beta_1, \beta_2, \ldots, \beta_n$ do not satisfy any linear equation with coefficients in $Q[i]$, this assumption is correct only when all the coefficients of $\beta_1, \beta_2, \ldots, \beta_n$ are zero in the above relation. On the other hand, we have:

$$w_{1j} \neq w_{2j} \neq w_{3j} \neq \ldots \neq w_{Mj} \neq 0 \; 1 \leq j \leq M \Rightarrow (w_{zj} - w_{pj}) \neq 0 \, p \neq z,$$
$$1 \leq j, p, z \leq M$$

Consequently:

$$(S-S')_p = 0 \; 1 \leq p \leq M$$

This means that the code is full rank.

At this point, an example of the proposed space time code for a group of three antennas will be discussed. Consider the following unitary matrix:

$$U = \begin{bmatrix} \frac{7}{9} & \frac{4}{9} e^{\frac{\pi}{8}i} & -\frac{4}{9} e^{\frac{\pi}{4}i} \\ \frac{4}{9} & \frac{1}{9} e^{\frac{\pi}{8}i} & \frac{8}{9} e^{\frac{\pi}{4}i} \\ -\frac{4}{9} & \frac{8}{9} e^{\frac{\pi}{8}i} & \frac{1}{9} e^{\frac{\pi}{4}i} \end{bmatrix} \quad (3)$$

$$W = \begin{bmatrix} \frac{7}{9} & \frac{4}{9} & -\frac{4}{9} \\ \frac{4}{9} & \frac{1}{9} & \frac{8}{9} \\ -\frac{4}{9} & \frac{8}{9} & \frac{1}{9} \end{bmatrix}$$

$$\Lambda = \text{diag}(1, e^{\frac{\pi}{8}i}, e^{\frac{\pi}{4}i})$$

The space time code has the following structure:

$$X = \begin{bmatrix} x_1 & x_1 & x_1 \\ x_1 & x_2 & x_2 \\ x_1 & x_2 & x_3 \end{bmatrix} \quad (4)$$

Where:

$$x_1 = \frac{7}{9} s_1 + \frac{4}{9} e^{\frac{\pi}{8}i} s_2 - \frac{4}{9} e^{\frac{\pi}{4}i} s_3 \quad (5)$$

$$x_2 = \frac{4}{9} s_1 + \frac{1}{9} e^{\frac{\pi}{8}i} s_2 + \frac{8}{9} e^{\frac{\pi}{4}i} s_3$$

$$x_3 = -\frac{4}{9} s_1 + \frac{8}{9} e^{\frac{\pi}{8}i} s_2 + \frac{1}{9} e^{\frac{\pi}{4}i} s_3$$

Since $1, e^{\pi/8i}, e^{\pi/4i}$ does not satisfy any linear equation with coefficients in $Q[i]$, and columns values of W are nonzero and non-equal, the code achieves full diversity.

|           | Time |       |        |
|-----------|------|-------|--------|
|           | t    | t + T | t + 2T |
| Antenna 1 | $x_1$ | $x_1$ | $x_1$ |
| Antenna 2 | $x_1$ | $x_2$ | $x_2$ |
| Antenna 3 | $x_1$ | $x_2$ | $x_3$ |

Referring back to FIG. 1, the transmitted signals are received by receiver 20 with one receive antenna 21. The received signal is then amplified by amplifier 22 and then channel estimator 23 provides an estimation of the channel coefficients which are used by the detector 24 to recover the transmitted information symbols. Transmitted signal $x_i$ from $i^{th}$ antenna undergoes a flat fading, which is modeled by multiplying it by a random variable, $h_i$. Accordingly, the received signal in the $m^{th}$ interval can be expressed as:

$$y_m = \sum_{j=1}^{m} x_j h_j + x_m \sum_{j=m+1}^{M} h_j + n_m, \quad (6)$$

where $n_m$ is a zero mean Gaussian random variable with variance $\sigma^2$. The received signal $y_m$ in M intervals can be collected and arranged into vector form as follows:

$$Y = HUS + N, \quad (7)$$

Where, $Y = [y_1, y_2, \ldots, y_M]^T$ is the received signal vector. The channel matrix H has the following form:

$$H = \begin{bmatrix} \sum_{i=1}^{M} h_i & 0 & 0 & \ldots & 0 \\ h_1 & \sum_{i=2}^{M} h_i & 0 & \ldots & 0 \\ h_1 & h_2 & \sum_{i=3}^{M} h_i & & 0 \\ \vdots & \vdots & \vdots & & \vdots \\ h_1 & h_2 & h_3 & \ldots & h_M \end{bmatrix}, \quad (8)$$

which is a lower triangular r-stochastic matrix and N is a zero mean Gaussian random vector with $\sigma^2 I$ covariance matrix. Therefore, when rate is one and the receiver employs one antenna, the channel matrix H, would change into a lower triangular r-stochastic matrix.

In some embodiments, encoder equations (equations 1 and 2) are performed in discrete domain by custom Integrated Chips, such as FPGAs and/or special purpose processor, such as signal processors with appropriate firmware. The result then may be converted to analog domain using a D/A converter. In some embodiments, the above equations are perfomed in software.

Figure 2:
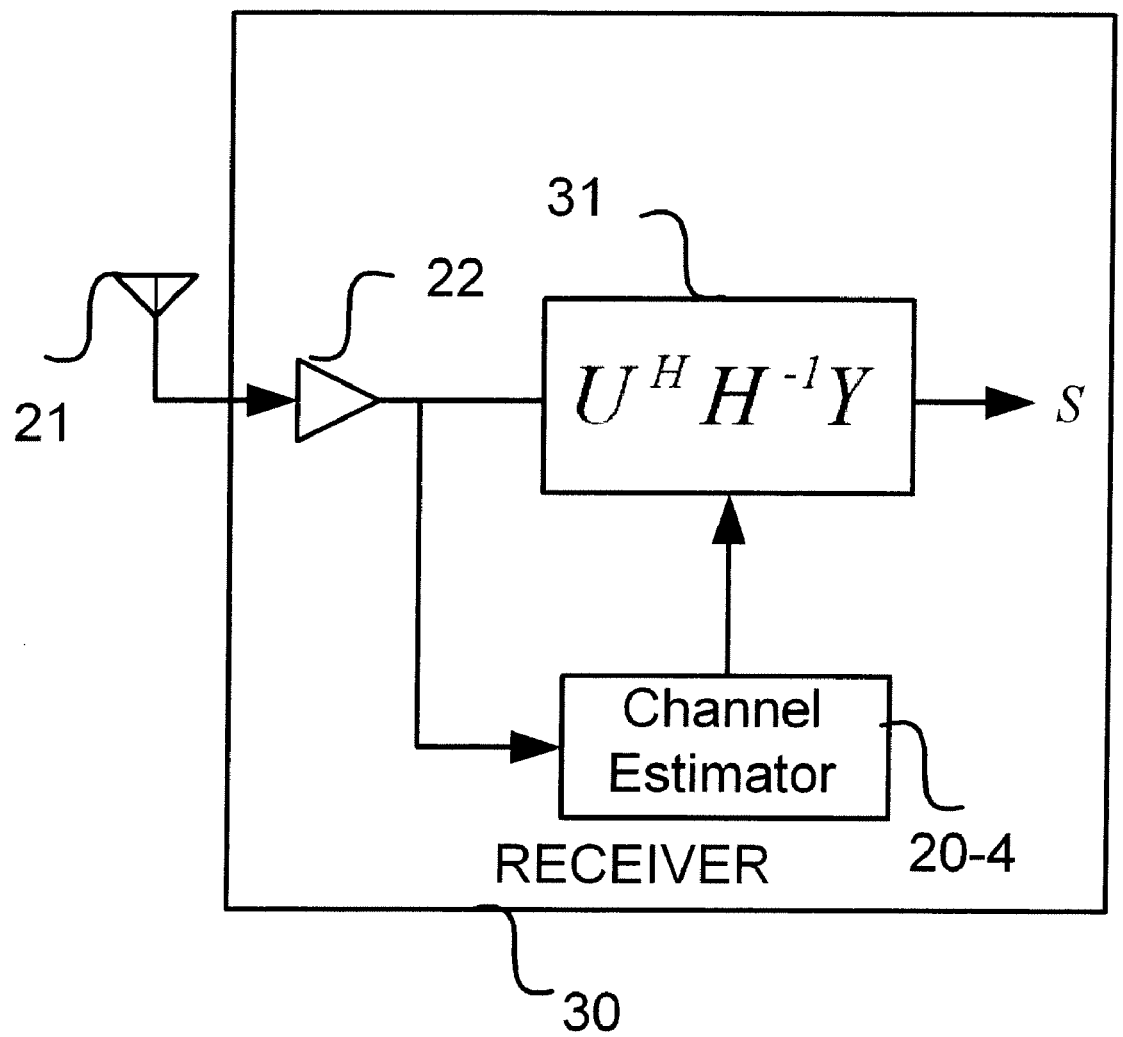
FIG. 2 is a block diagram of a single antenna receiver using Zero Force (ZF) detection technique, according to some embodiments of the present invention.

FIG. 2 presents a Zero Force (ZF) receiver with one antenna 30, according to some embodiments of the present invention. A Zero force receiver is a linear receiver that does not consider the effects of noise. The ZF receiver tries to mitigate the effect of symbols on each other. This is done by multiplication of the received signal vector by the inverse of channel matrix. This results in the removal of the interference from all other symbols. Therefore, when a receiver with one antenna employs Zero Force (ZF) equalizer, there is no need to use the direct inversion of the channel matrix that normally would be in the order of $N^3$. In this figure, the channel estimator 34 provides the channel matrix H and using this matrix the detector 31 recovers an estimation of the transmitted symbols by calculating:

$$\hat{S} = U^H H^{-1} Y \quad (9)$$

The channel matrix is a lower triangular r matrix which its inverse has a closed form. As one with ordinary skill in the related art would know, inverse of a lower triangular matrix is also a lower triangular matrix. Using r-stochastic property of the channel matrix, its inverse can be expressed by:

For $i = 1, 2, \ldots, M$

For $j = 1, 2, \ldots, M$

If $i = j$ $$H_{i,i}^{-1} = \frac{1}{\sum_{k=i}^{M} h_k} \tag{10}$$

if $i > j$ $$H_{i,j}^{-1} = -\frac{h_j}{\left(\sum_{k=j}^{M} h_k\right)\left(\sum_{k=j+1}^{M} h_k\right)} \tag{11}$$

if $i < j$ $$H_{i,j}^{-1} = 0$$

so, the inverse of channel matrix can be written as:

$$H^{-1} = \begin{bmatrix} \frac{1}{\sum_{i=1}^{M} h_i} & 0 & 0 & \ldots & \ldots & \ldots & \ldots & 0 \\ -\frac{h_1}{\left(\sum_{k=1}^{M} h_k\right)\left(\sum_{k=2}^{M} h_k\right)} & \frac{1}{\sum_{i=2}^{M} h_i} & 0 & \ldots & \ldots & \ldots & \ldots & 0 \\ -\frac{h_1}{\left(\sum_{k=1}^{M} h_k\right)\left(\sum_{k=2}^{M} h_k\right)} & -\frac{h_2}{\left(\sum_{k=2}^{M} h_k\right)\left(\sum_{k=3}^{M} h_k\right)} & \frac{1}{\sum_{k=3}^{M} h_i} & \ldots & \ldots & \ldots & \ldots & 0 \\ -\frac{h_1}{\left(\sum_{k=1}^{M} h_k\right)\left(\sum_{k=2}^{M} h_k\right)} & -\frac{h_2}{\left(\sum_{k=2}^{M} h_k\right)\left(\sum_{k=3}^{M} h_k\right)} & -\frac{h_3}{\left(\sum_{k=3}^{M} h_k\right)\left(\sum_{k=4}^{M} h_k\right)} & \ddots & & & & \vdots \\ \vdots & \vdots & \vdots & & \ddots & & & \vdots \\ \vdots & \vdots & \vdots & & & \ddots & & \vdots \\ \vdots & \vdots & \vdots & & & & \ddots & \vdots \\ -\frac{h_1}{\left(\sum_{k=1}^{M} h_k\right)\left(\sum_{k=2}^{M} h_k\right)} & -\frac{h_2}{\left(\sum_{k=2}^{M} h_k\right)\left(\sum_{k=3}^{M} h_k\right)} & -\frac{h_3}{\left(\sum_{k=3}^{M} h_k\right)\left(\sum_{k=4}^{M} h_k\right)} & \ldots & \ldots & \ldots & \ldots & \frac{1}{h_M} \end{bmatrix} \tag{12}$$

or, we have:

$$H^{-1} = \begin{bmatrix} \frac{1}{H_{1,1}} & 0 & 0 & \ldots & \ldots & \ldots & \ldots & 0 \\ -\frac{h_1}{H_{1,1} \times H_{2,2}} & \frac{1}{H_{2,2}} & 0 & \ldots & \ldots & \ldots & \ldots & 0 \\ -\frac{h_1}{H_{1,1} \times H_{2,2}} & -\frac{h_2}{H_{2,2} \times H_{3,3}} & \frac{1}{H_{3,3}} & \ldots & \ldots & \ldots & \ldots & 0 \\ -\frac{h_1}{H_{1,1} \times H_{2,2}} & -\frac{h_2}{H_{2,2} \times H_{3,3}} & -\frac{h_3}{H_{3,3} \times H_{4,4}} & \ddots & & & & \vdots \\ \vdots & \vdots & \vdots & & \ddots & & & \vdots \\ \vdots & \vdots & \vdots & & & \ddots & & \vdots \\ \vdots & \vdots & \vdots & & & & \ddots & \vdots \\ -\frac{h_1}{H_{1,1} \times H_{2,2}} & -\frac{h_2}{H_{2,2} \times H_{3,3}} & -\frac{h_3}{H_{3,3} \times H_{4,4}} & \ldots & \ldots & \ldots & \ldots & \frac{1}{H_{M,M}} \end{bmatrix} \tag{13}$$

Consider an ordinary space time code. The received signal vector, $Y_o$, can be written as:

$$Y_o = H_o S + N \tag{14}$$

where $H_o$ is the channel matrix for an ordinary code, S is transmitted signal vector and N is defined in (7).

The ZF receiver output, $\hat{S}$ for this code can be written as:

$$\hat{S} = H_o^{-1} Y_o \tag{15}$$

This receiver needs direct inversion of matrix H. Therefore computational complexity of ZF receiver for the T structure is much lower than using a ZF receiver for an ordinary space-time structure. Since the channel matrix is an r-stochastic matrix, as it can be seen in equations (12) and (13), it is possible to use (2×M+1) equations instead of the direct inversion of channel matrix. In this case, the invention needs to only compute the (2×M+1) matrix element to each the inversion of channel matrix.

Figure 3:
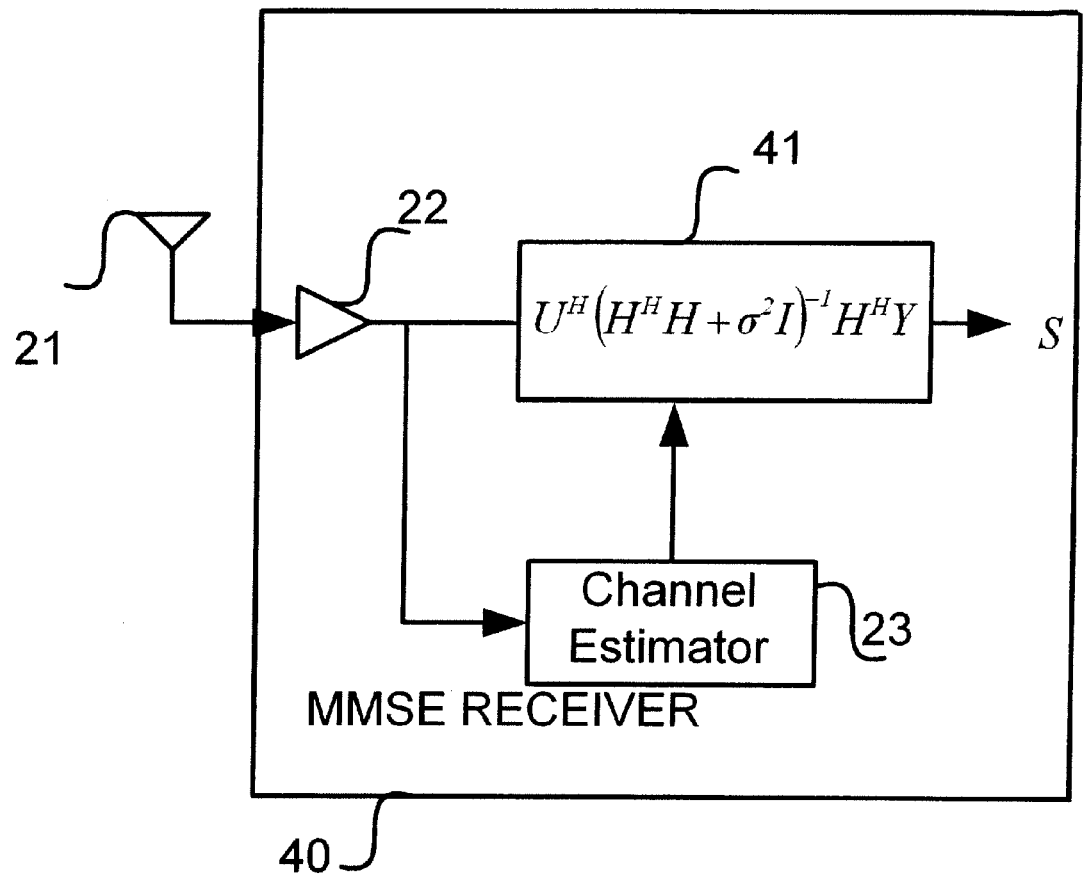
FIG. 3 is a block diagram of a single antenna receiver using minimum mean squared error (MMSE) detection technique, according to some embodiments of the present invention.

FIG. 3 presents a minimum mean squared error (MMSE) receiver with one antenna 40, according to some embodiments of the present invention. As mentioned above, the ZF receiver does not consider the effect of noise. However, a MMSE receiver multiplies the received signal vector by a matrix to minimize the effect of noise. For the proposed structure, the MMSE detector 41 receiver has the following structure:

$$\hat{S} = U^H(H^H H + \sigma^2 I)^{-1} H^H Y \quad (16)$$

where H and Y are defined in (7), U is the and $\sigma^2 I$ is covariance matrix of random vector N.

For an ordinary space time matrix the MMSE estimation of data can be written as:

$$\hat{S} = (H_o^H H_o + \sigma^2 I)^{-1} H_o^H Y_o \quad (17)$$

where $H_o$ and $Y_o$ are defined in (14)

Where due to lower triangularity of the H, the computational complexity of the MMSE receiver is much lower than an ordinary code. Therefore, when a receiver with one antenna employees an MMSE equalizer, the complexity of the receiver is in an order of $N^2$, compared with a typical channel matrix that its order is $N^3$.

Figure 4:
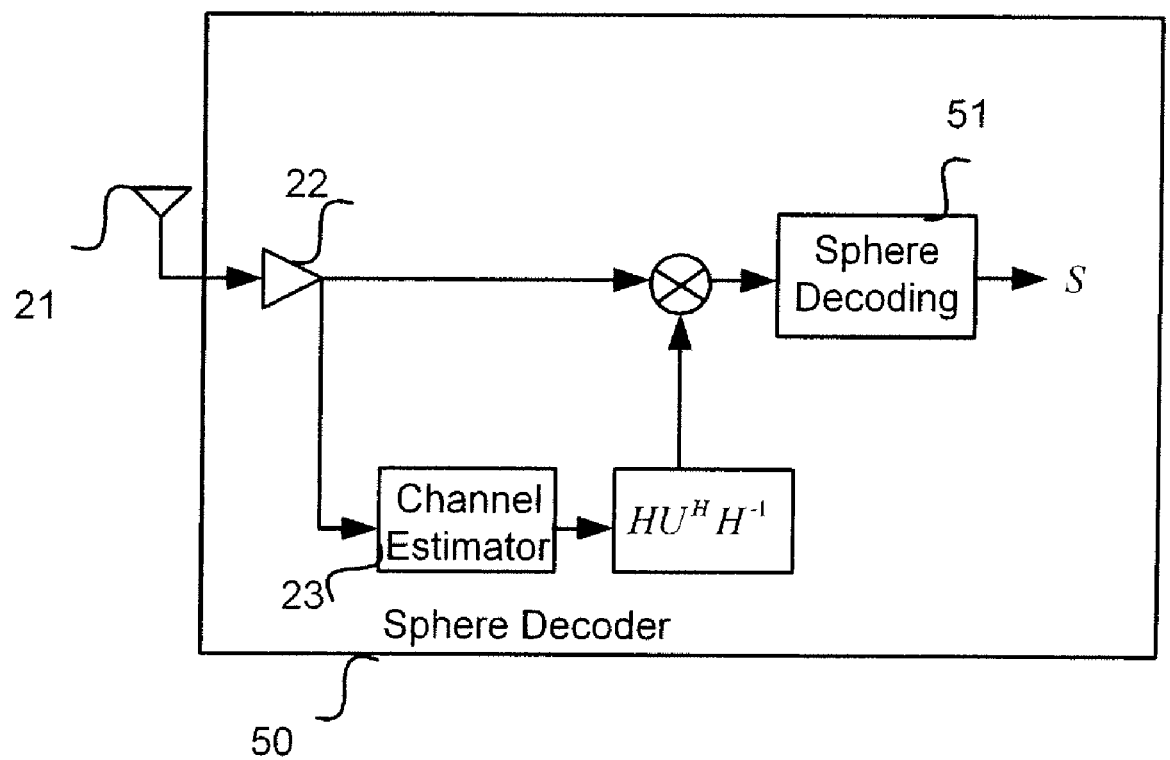
FIG. 4 is a block diagram of a single antenna receiver using sphere decoding algorithm, according to some embodiments of the present invention.

FIG. 4 a receiver with one antenna employing Sphere Decoder 50, according to some embodiments of the present invention. Here we first briefly describe sphere decoding algorithm. Consider following minimization problem:

$$\min_Z (\|F - GZ\|^2),$$

where F and G are n×1 and n×m vector and matrix respectively (n≧m). Z is a n×1 vector where its entries take value from a set of countable finite numbers. One can choose to solve the following problem instead:

1—Find all Z vectors that satisfy $\|F-GZ\|^2 \leq d^2$ where d is a positive number.
2—Among these vectors find one that minimizes $\|F-GZ\|^2$.

To perform the first step first QR factorization is applied to matrix G:

$$G = Q_{n \times n} \begin{bmatrix} R_{m \times m} \\ 0_{(n-m) \times m} \end{bmatrix}$$

where R is an m×m upper triangular matrix, and Q=[Q₁, Q₂] is an orthogonal matrix.

The matrices $Q_1$ and $Q_2$ represent the first m and last n−m orthonormal columns of Q, respectively. Using this factorization the first step change into:

$$\left\| F - [Q1, Q2] \begin{bmatrix} R \\ 0 \end{bmatrix} Z \right\|^2 = \left\| \begin{bmatrix} Q_1^* \\ Q_2^* \end{bmatrix} F - RZ \right\|^2 = \|Q_1^* F - RZ\|^2 + \|Q_2^* F\|^2 \leq d^2$$

Defining $$A = Q_1^* F$$

$$d'^2 = d^2 - \|Q_2^* F\|^2$$

We have
$\|A - RZ\|^2 \leq d'^2$ and the first step change into:
I. Find $z_{11}$ such that satisfies in $\|A_{11} - R_{11}z_{11}\|^2 \leq d'^2$
II. Using $z_{11}$ values from previous step find $z_{21}$ such that satisfies $\|A_{11} - R_{11}z_{11}\|^2 + \|A_{21} - R_{21}z_{11} - R_{21}z_{21}\|^2 \leq d'^2$
III. Continue this recursive algorithm until all variables are found.

In the step 2, the vector that minimizes $\|F-GZ\|^2$ is computed from the previous step solution. See, for example, B. Hassibi and H. Vikalo "On the Sphere Decoding Algorithm I. Expected Complexity", IEEE Transactions On Signal Processing, Vol. 53, No. 8, Aug. 2005 for more details, the entire contents of which are hereby expressly incorporated herein.

The maximum likelihood receiver minimizes the following formula:

$$\hat{S}_{ML} = \min_S (\|Y - HUS\|^2) \quad (18)$$

where H and Y are defined in (7), U is the unitary matrix, S is transmitted vector, and $\hat{S}_{ML}$ is output of ML receiver. One solution for the above relation is putting all possible S vectors in the maximum likelihood relation and finding the vector which minimizes it. This method is an MP-Hard problem where its complexity's increases exponentially. Another way is using sphere decoding algorithm.

There are two different solutions for applying sphere decoding technique to this MP-complete problem. First, applying sphere decoding technique in the new space P which is defined by:

$$P = US, \quad (19)$$

which is simply the rotated version of original space, S, and sphere decoding will easily change into:

$$\hat{S}_{ML} = U^H \min_P (\|Y - HP\|^2) \quad (20)$$

where H and Y are defined in (7), U is the unitary matrix, P is defined in (19) and $\hat{S}_{ML}$ is output of ML receiver.

Since H is a lower triangular matrix, the sphere decoding can be performed without QR decomposition. Note that, a QR decomposition of a matrix is a decomposition of the matrix into an orthogonal and a right triangular matrix.

Alternatively, the received vector Y may be multiplied by $HU^H H^{-1}$ which preserves norm 2. By this multiplication, the problem changes into:

$$\hat{S}_{ML} = \min_S (\|HW^H H^{-1} - HBS\|^2) \quad (21)$$

where H and Y are defined in (7), U is the unitary matrix, S is transmitted vector and $\hat{S}_{ML}$ is output of ML receiver. Again sphere decoding can be performed without QR decomposition. Therefore, when a receiver uses sphere decoding, the QR decompositions can be omitted and the computational complexity will be substantially decreased compared with a typical channel matrix. Also, when a receiver with more than one antenna uses sphere decoder the QR, decompositions can be omitted.

Figure 5:
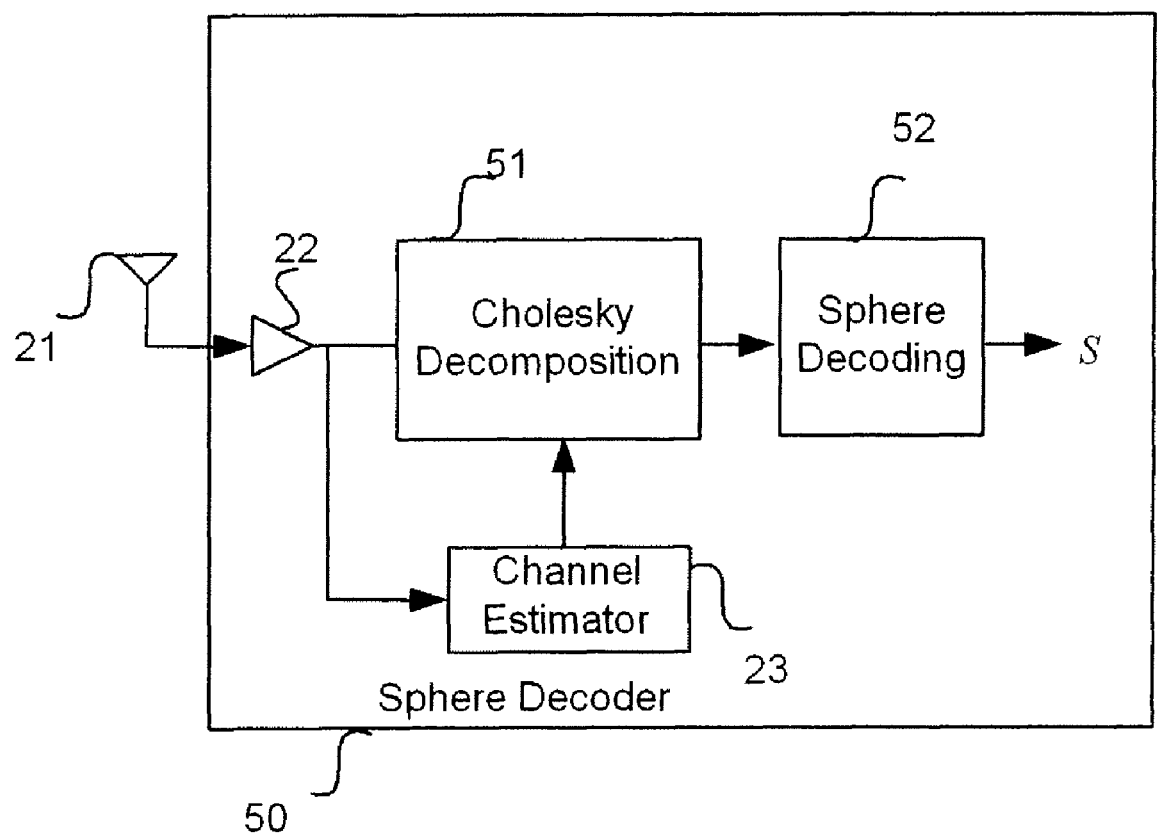
FIG. 5 is a block diagram of a single antenna receiver using Cholesky decomposition and sphere decoding algorithm, according to some embodiments of the present invention.

FIG. 5 represents a receiver with one antenna employing Sphere Decoder 60, according to some embodiments of the present invention. In a Cholesky decomposition, the $HH^H$ channel matrix is decomposed into the product of a low triangular matrix and its transpose. (A Cholesky decomposition is a decomposition of a symmetric, positive-definite matrix into the product of a lower triangular matrix and its conjugate transpose.).

$$HH^T = VV^T, \quad (22)$$

where, V is a lower triangular matrix and H can be expressed by:

$$H = \begin{bmatrix} H_r & H_i \\ -H_i & H_r \end{bmatrix}, \quad (23)$$

and where $H_r$ is the real part of H and $H_i$ is the imaginary part of H, which are both low triangular in this case.

Matrix V has some interesting properties which can decrease the Cholesky deposition computational complexity. One can express V as:

$$V = \begin{bmatrix} A & C \\ B & D \end{bmatrix} \quad (24)$$

where C is a zero matrix and A and C are low triangular. V has the following properties:
1—In matrices A and B, in each column elements under the diagonal entry are the same. This property can decrease the amount of Cholesky decomposition computation.
2—In matrix B the first entry of the first column is zero, which can ease the Cholesky decomposition and also decrease the tree search computations in sphere decoding technique.

Here is an example of a lower triangular matrix obtained by Cholesky decomposition of r-stochastic channel matrix:

| 1.67962 | 0 | 0 | 0 | 0 | 0 | 0 | 0 | 0 | 0 |
|---|---|---|---|---|---|---|---|---|---|
| 0.507953 | 1.321661 | 0 | 0 | 0 | 0 | 0 | 0 | 0 | 0 |
| 0.507953 | 1.331053 | 0.372559 | 0 | 0 | 0 | 0 | 0 | 0 | 0 |
| 0.507953 | 1.331053 | 0.176563 | 1.728174 | 0 | 0 | 0 | 0 | 0 | 0 |
| 0.507953 | 1.331053 | 0.176563 | 1.896229 | 0.310257 | 0 | 0 | 0 | 0 | 0 |
| 0 | 0.549544 | −0.01385 | −0.00157 | 0.000851 | 1.587114 | 0 | 0 | 0 | 0 |
| −0.43243 | 0.166194 | −0.88696 | −0.10059 | 0.054487 | 0.472143 | 0.876063 | 0 | 0 | 0 |
| −0.43243 | 0.415035 | −0.89323 | −0.28401 | 0.15384 | 0.385692 | 0.856026 | 0.159802 | 0 | 0 |
| −0.43243 | 0.415035 | −0.0457 | −0.18789 | 0.420945 | 0.393042 | 1.704567 | −0.20924 | 1.1704 | 0 |
| −0.43243 | 0.415035 | −0.0457 | −0.24519 | 0.451983 | 0.392968 | 1.696096 | −0.2954 | 1.395139 | 0.249502 |

Therefore, when receiver with one antenna using sphere decoder for the Cholesky decompositions, the computational complexity is decreased at least % 25 in compare with a typical channel matrix. Also, when a sphere decoder is used in the receiver, the computation accuracy is increased due to the existence of a fixed zero in the Cholesky decomposition matrix.

Figure 6:
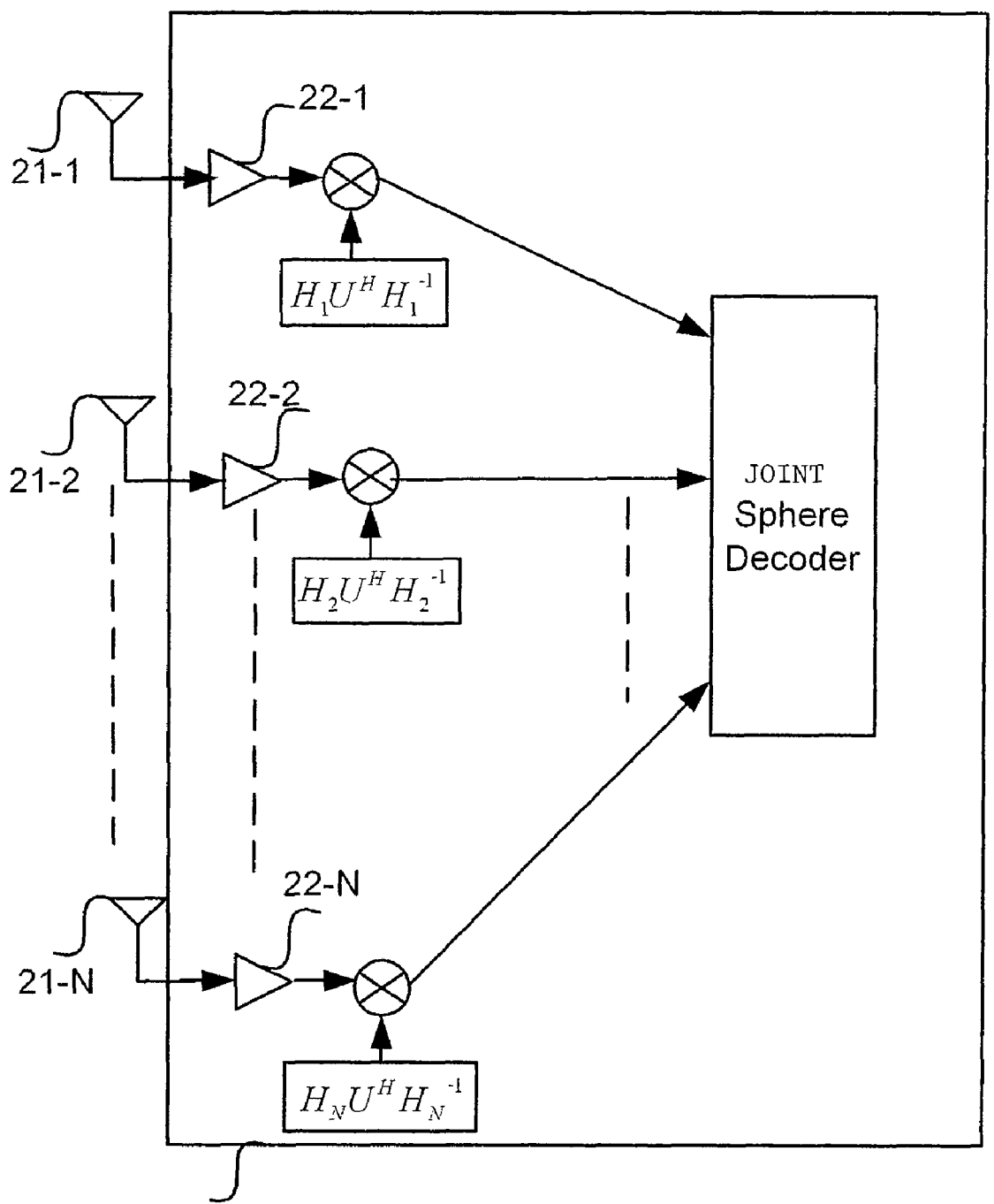
FIG. 6 is a block diagram of an N antennas receiver using sphere decoding algorithm, according to some embodiments of the present invention.

FIG. 6 represents a receiver with one antenna employing Sphere Decoder 70, according to some embodiments of the present invention.

Let the output vector of ith receive antenna be $Y_i$, then:

$$Y_i = H_i US + N_i, \quad 1 \leq i \leq N \quad (25)$$

where $H_i$ is the equivalent channel matrix conveying fading coefficient between the transmitter and ith receive antenna:

$$H_i = \begin{bmatrix} \sum_{j=1}^{M} h^i_j & 0 & 0 & \cdots & 0 \\ h^i_1 & \sum_{j=2}^{M} h^i_j & 0 & \cdots & 0 \\ h^i_1 & h^i_2 & \sum_{j=3}^{M} h^i_j & & 0 \\ \vdots & \vdots & \vdots & \vdots & \vdots \\ h^i_1 & h^i_2 & h^i_3 & \cdots & h^i_M \end{bmatrix}$$

where $h^i_j$ is the fading coefficient between ith receive and jth transmit antenna. $N_i$ is the noise vector at the output of ith receive antenna. The maximum likelihood receiver minimizes the following formula:

$$\hat{S}_{ML} = \min_{S} \left( \sum_{i=1}^{N} \|Y_i - H_i US\|^2 \right) \quad (26)$$

where $H_i$ and $Y_i$ are defined in (25), U is the unitary matrix, S is transmitted vector and $\hat{S}_{ML}$ is output of ML receiver.

Similar to one receive antenna case, there are two solutions for applying sphere decoding technique to this problem.

First, applying sphere decoding technique in the new space V which is defined by:

$$P = US$$

which is a simple rotation of original space S and sphere decoding will simply change into:

$$\hat{S}_{ML} = U^H \min_{P} \left( \sum_{i=1}^{N} \|Y_i - H_i P\|^2 \right) \quad (27)$$

where $H_i$ and $Y_i$ are defined in (25), U is the unitary matrix, P is defined in (19) and $\hat{S}_{ML}$ is output of ML receiver. Since all $H_i$s are lower triangular matrices, the sphere decoding can be performed without QR decomposition. Here we modify the modify the step 1 of sphere decoding algorithm:

I. Find $p_{11}$ such that satisfies in $$\sum_{i=1}^{N} \|y_i(1) - H_i(1,1)p_{11}\|^2 \le d^2$$

II. Using $p_{11}$ values from previous step find $p_{21}$ such that satisfies $$\sum_{i=1}^{N} \|y_i(1) - H_i(1,1)p_{11}\|^2 + \sum_{i=1}^{N} \|y_i(2) - H_i(2,1)p_{11} - H_i(2,2)p_{21}\|^2 \le d^2$$

III. Continue this recursive algorithm until all variables are found.

Another solution is multiplying each received vector $Y_i$, by $H_i W^H H_i^{-1}$. By this multiplication, the problem changes into calculating:

$$\hat{S}_{ML} = \min_S \left( \sum_{i=1}^{N} \|H_i W^H H_i^{-1} Y_i - H_i B S\|^2 \right) \quad (28)$$

where $H_i$ and $Y_i$ are defined in (25), U is the unitary matrix, S is transmitted vector and $\hat{S}_{ML}$ is output of ML receiver.

Lets now define:

$$Y'_i = [y'_i(1), y'_i(2), \ldots, y'_i(M)]^T = H_i W^H H_i^{-1} Y_i \quad 1 \le i \le N$$

Here we modify the modify the step 1 of sphere decoding algorithm:

I. Find $s_{11}$ such that satisfies in $$\sum_{i=1}^{N} \|y'_i(1) - H_i(1,1)\beta_i s_{11}\|^2 \le d^2$$

II. Using $s_{11}$ values from previous step find $s_{21}$ such that satisfies $$\sum_{i=1}^{N} \|y'_i(1) - H_i(1,1)\beta_1 s_{11}\|^2 + \sum_{i=1}^{N} \|y'_i(1) - H_i(1,1)\beta_1 s_{11} - H_i(2,1)\beta_2 s_{21}\|^2 \le d^2$$

III. Continue this recursive algorithm until all variables are found.

Figure 7:
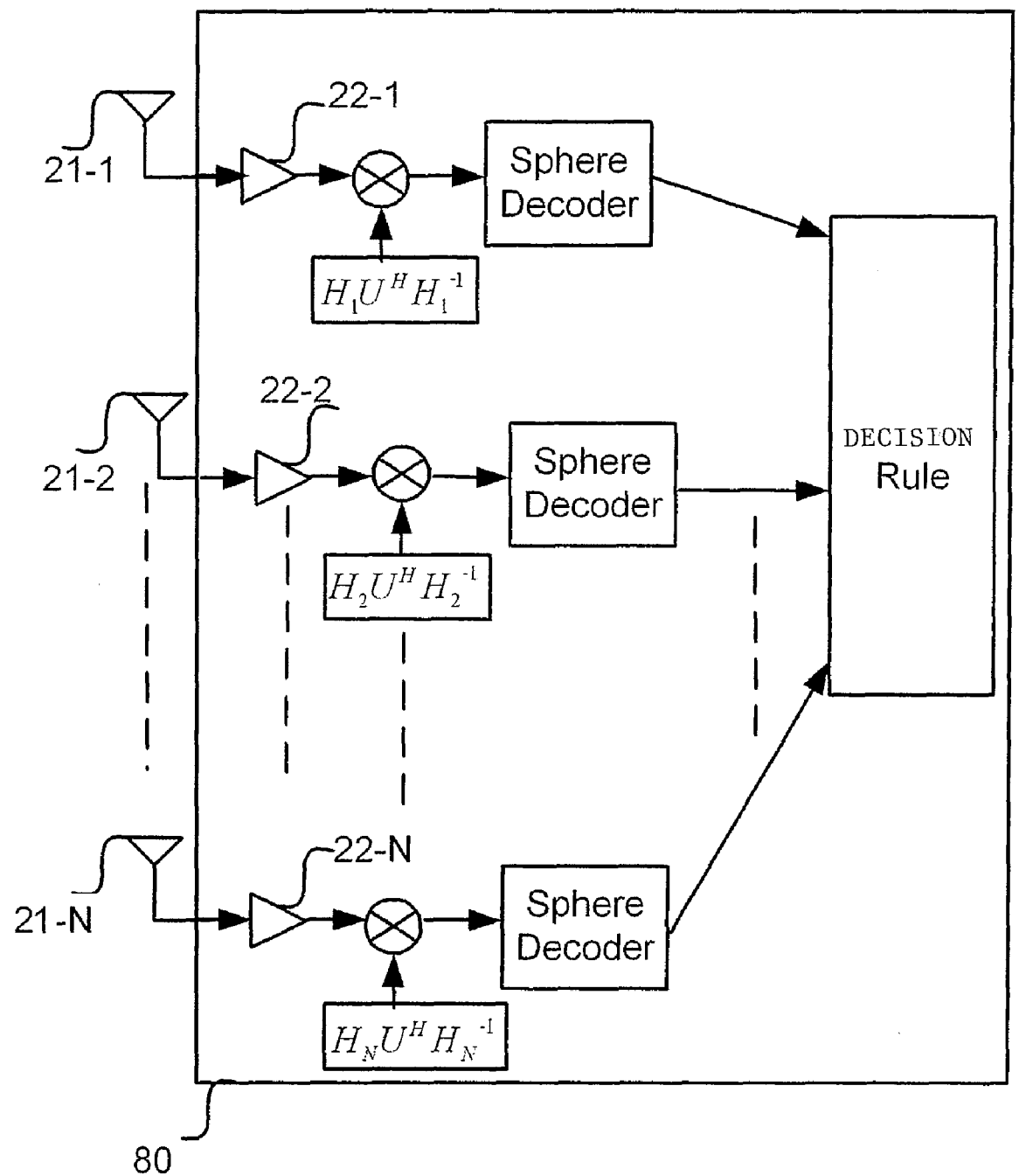
FIG. 7 is a block diagram of an N antennas receiver using a sub optimum decision rule according to some embodiments of the present invention.

FIG. 7 represents a space time transmitter according to some embodiments of the present invention. Here, the sphere decoding for multi-receive antenna case is simplified even more. Let $f(x)$ and $g(x)$ be two positive functions. One skilled in the art would know that $$\min_x \{f(x) + g(x)\}$$

is equal to $$X_f = \min_x \{f(x)\} \text{ or } X_g = \min_x \{g(x)\}$$

or a linear combination of these two values. If the linear combination is omitted, the exact minimum may not be achieved, but $\min\{f(x_f)+g(x_f), f(x_g)+g(x_g)\}$ is sufficiently close to the exact minimum.

Since $\|\ \|^2$ is a positive function, it is possible to use the theorem discussed in previous paragraph for reducing the complexity. Neglecting the linear combination form the theorem, the receiver performs the following steps to find the minimum:

1-Calculate $\bar{S}_j = \min_S \left( \|H_j W^H H_j^{-1} Y_j - H_j BS\|^2 \right)$ for j = $\quad$ (30)

1 to N using modified sphere technique

2-Calculate $\Phi_i = \sum_{j=1}^{N} \|H_j W^H H_j^{-1} Y_j - H_j B \bar{S}_i\|^2$ for $i = 1$ to N $\quad$ (31)

3-Find $\min_i \{\Phi_1, \Phi_2, \ldots, \Phi_N\}$ $\quad$ (32)

4-$\hat{S} = \bar{S}_i$ $\quad$ (33)

where $H_i$ and $Y_i$ are defined in (25), U is the unitary matrix, S is transmitted vector and $\hat{S}$ is output of the receiver.

Figure 8:
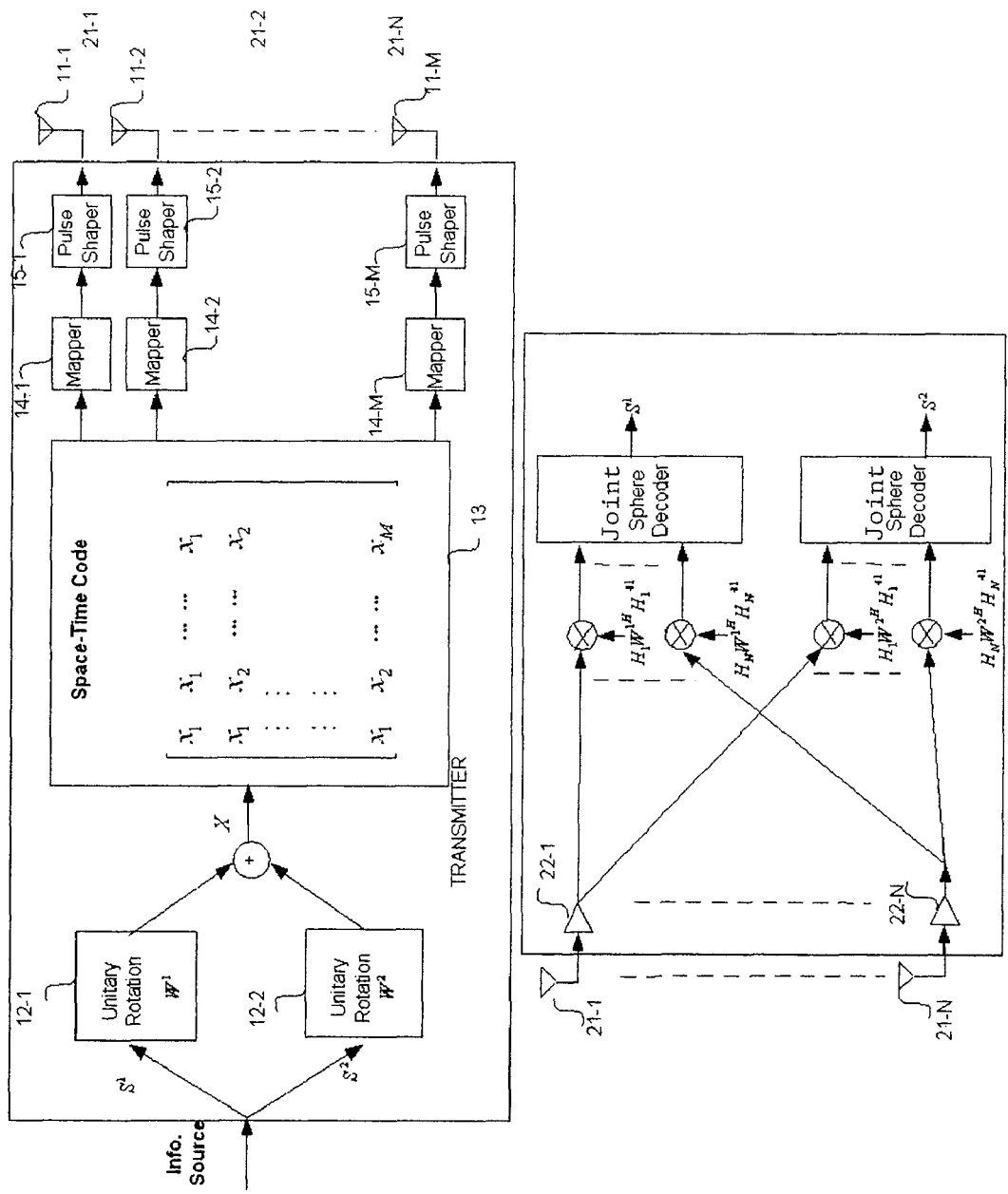
FIG. 8 is a block diagram of an M antennas transmitter with rate=2 and N antennas receiver using sphere decoding, according to some embodiments of the present invention.

FIG. 8 represents a space time transmitter with Rate=2. Here for a given number of transmit antennas, M, and transmission rate 2 the code construction method is discussed. As we know a space time code rate is defined as:

$$R = \frac{\text{Number of Transmitted Symbols}}{\text{Number of Time Slots Used for Transmission}}$$

So this code should be able to transmit 2M, $S=[s_1, s_2, \ldots, s_{2M}]^T$, symbols. We define the vector X that the T matrix is based on it as:

$$X = US = WBS$$

where $$(w_{pj} - w_{lj}) \in Q[i] \ne 0 \; p \ne l, 1 \le j \le 2M$$

Let's define W in to two sub matrices:

$$W = [W^2, W^1]$$

therefore:

$$X = (W^1 B^1 S^1 + W^2 B^2 S^2)$$

$(W^i)^H W^i = I_M \; i = 1, 2$
$(W^i)^H W^j = 0 \; i \ne j$
$B = \text{diag}(\beta_1, \beta_2, \ldots, \beta_{2M})$
$B^1 = \text{diag}(\beta_1, \beta_2, \ldots, \beta_M)$
$B^2 = \text{diag}(\beta_{M+1}, \beta_{M+2}, \ldots, \beta_{2M})$
$S^1 = [s_1, s_2, \ldots, s_M]^T$
$S^2 = [s_{M+1}, s_{M+2}, \ldots, s_{2M}]^T$ Proof of full diversity is the same as the case R=1.

Let the output vector of ith receive antenna be $Y_i$, then:
$Y_i = H_i WS + N_i \; 1 \le i \le N$ where $H_i$ is the equivalent channel matrix conveying fading coefficient between the transmitter $$H_i = \begin{bmatrix} \sum_{j=1}^{M} h_j^i & 0 & 0 & \cdots & 0 \\ h_1^i & \sum_{j=2}^{M} h_j^i & 0 & \cdots & 0 \\ h_1^i & h_2^i & \sum_{j=3}^{M} h_j^i & \cdots & 0 \\ \vdots & \vdots & \vdots & \cdots & \vdots \\ h_1^i & h_2^i & h_3^i & \cdots & h_M^i \end{bmatrix}$$

where $h_j^i$ is the fading coefficient between ith receive and jth transmit antenna. $N_i$ is the noise vector at the output of ith receive antenna. The maximum likelihood receiver minimizes the following formula:

$$\hat{S}_{ML} = \min_{S} \left( \sum_{i=1}^{N} \|Y_i - H_i WBS\|^2 \right)$$

where $H_i$ and $Y_i$ are defined in (25), U is the unitary matrix, S is transmitted vector and $\hat{S}_{ML}$ is output of ML receiver.

The above relation can be simplified. In order to detect the symbols that are multiplied by $W^1$ or $W^2$ we have:

$$\hat{S}_{ML}^1 = \min_{S^1} \left( \sum_{i=1}^{N} \|H_i(W^1)^H H_i^{-1} Y_i - H_i B^1 S^1\|^2 \right)$$

$$\hat{S}_{ML}^2 = \min_{S^2} \left( \sum_{i=1}^{N} \|H_i(W^2)^H H_i^{-1} Y_i - H_i B^2 S^2\|^2 \right)$$

The rest of the decoding procedure is done in each branch completely like decoding in the case rate one which is described before.

Successive Interference Cancellation:

Rate=1: for detection of $S=[s_1, s_2, \ldots, s_M]^T$ we define $Y'_i$ as:

$$Y'_i = H_i U^H H_i^{-1} Y_i \quad 1 \le i \le N$$

In some embodiments, the receiver performs the following steps to find M symbols:

$$1 - \bar{s}_1 = \min_{s_1} \left( \sum_{i=1}^{N} \|y'_i(1) - H_i(1,1)\beta_1 s_1\|^2 \right)$$

$$1 - \bar{s}_p = \min_{s_p} \left( \sum_{i=1}^{N} \left\| y'_i(p) - \sum_{j=1}^{p-1} h_j^i \beta_j \bar{s}_j - H_i(p,p)\beta_p s_p \right\|^2 \right) 2 \le p \le M$$

Rate = 2:

for detection of $S^1 = [s_1, s_2, \ldots, s_M]^T$ $$Y'_i = H_i(W^1) H_i^{-1} Y_i \quad 1 \le i \le N$$

$$\bar{s}_1 = \min_{s_1} \left( \sum_{i=1}^{N} \|y'_i(1) - H_i(1,1) s_1\|^2 \right)$$

$$\bar{s}_p = \min_{s_p} \left( \sum_{i=1}^{N} \left\| y'_i(p) - \sum_{j=1}^{p-1} h_j^i \beta_j \bar{s}_j - H_i(p,p)\beta_p s_p \right\|^2 \right) 2 \le p \le M$$

for detection of $S^2 = [s_{M+1}, s_{M+2}, \ldots, s_{2M}]^T$ $$Y'_i = H_i(W^2) H_i^{-1} Y_i \quad 1 \le i \le N$$

$$\bar{s}_{M+1} = \min_{s_{M+1}} \left( \sum_{i=1}^{N} \|y'_i(1) - H_i(1,1) s_{M+1}\|^2 \right)$$

$$\bar{s}_{M+p} = \min_{s_{M+p}} \left( \sum_{i=1}^{N} \left\| y'_i(p) - \sum_{j=1}^{p-1} h_j^i \beta_{M+j} \bar{s}_{M+j} - H_i(p,p)\beta_{M+p} s_{M+p} \right\|^2 \right) 2 \le p \le M$$

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the appended claims.

What is claimed is:

1. A transmitter for wireless data communication comprising:
   a unitary rotation matrix processor for combining incoming information data stream and outputting a plurality of transmission symbols;
   an encoder for encoding the plurality of transmission symbols;
   M number of mapper units for mapping the symbols outputted from the encoder into a two dimensional constellation having M data symbols, where M is an integer greater than 1;
   M number of pulse shaper units, each for modulating a respective signal from the two dimensional constellation; and
   M number of antennas to transmit the M data symbols in M time slots responsive to the pulse shaper units, wherein each antenna transmits a respective data symbol from the M symbols in a respective time slot of the M time slots, wherein the encoder is configured to determine which symbol to be transmitted from each antenna in each time slot, wherein the unitary rotation matrix processor processes a unitary rotation matrix U satisfying the following condition to achieve full diversity:

$$U = W*B$$

where, $B = \text{diag}(\beta_1, \beta_2, \ldots, \beta_n)$ $$W = \begin{bmatrix} w_{11} & w_{12} & \cdots & w_{1M} \\ w_{21} & w_{22} & \cdots & w_{2M} \\ \vdots & \vdots & \ddots & \vdots \\ w_{M1} & w_{M2} & \cdots & w_{MM} \end{bmatrix}$$

where $\beta_1, \beta_2, \ldots, \beta_n$ are n numbers that do not satisfy the following equation:

$$a_1\beta_1 + a_2\beta_2 + \ldots + a_n\beta_n = 0 \{a_1, a_2, \ldots, a_n\} \in Q[i]$$

and W is a unitary matrix which in each of its columns, all entries have different nonzero values:

$$(w_{pj} - w_{lj}) \in Q[i] \ne 0 \, p \ne l, 1 \le j \le M.$$

2. The transmitter of claim 1, wherein unitary rotation matrices ($W^1$ and $W^2$), which each pair of them is orthogonal are used to increase a transmission rate.

3. The transmitter of claim 1, wherein each antenna transmits the M symbols using a lower triangular r-stochastic channel matrix, and wherein a receiver for receiving the transmitted data includes one antenna.

4. A transmitter for wireless data communication comprising:
- a unitary rotation matrix processor for combining incoming information data stream and outputting a plurality of transmission symbols;
- an encoder for encoding the plurality of transmission symbols;
- M number of mapper units for mapping the symbols outputted from the encoder into a two dimensional constellation having M data symbols, where M is an integer greater than 1;
- M number of pulse shaper units, each for modulating a respective signal from the two dimensional constellation; and
- M number of antennas to transmit the M data symbols in M time slots responsive to the pulse shaper units, wherein each antenna transmits a respective data symbol from the M symbols in a respective time slot of the M time slots, wherein the encoder is configured to determine which symbol to be transmitted from each antenna in each time slot, wherein each antenna transmits the M symbols using a triangular r-stochastic channel matrix H defined by:

$$H_i = \begin{bmatrix} \sum_{i=1}^{M} h_i & 0 & 0 & \cdots & 0 \\ h_1 & \sum_{i=2}^{M} h_i & 0 & \cdots & 0 \\ h_1 & h_2 & \sum_{i=3}^{M} h_i & \cdots & 0 \\ \vdots & \vdots & \vdots & \cdots & \vdots \\ h_1 & h_2 & h_3 & \cdots & h_M \end{bmatrix}$$

where $h_i$ is a random variable for the $i^{th}$ antenna.

5. The transmitter of claim 1, wherein the encoder is a member of T matrices family.

6. A wireless data communication system comprising:
a transmitter including:
- a unitary rotation matrix processor for processing incoming information data stream and outputting a plurality of transmission symbols;
- an encoder for encoding the plurality of transmission symbols;
- M number of mapper units for mapping the symbols outputted from the encoder into a two dimensional constellation having M data symbols, where M is an integer greater than 1;
- M number of pulse shaper units, each for modulating a respective signal from the two dimensional constellation; and
- M number of antennas to transmit the M data symbols in M time slots responsive to the pulse shaper units, wherein each antenna transmits a respective data symbol from the M symbols in a respective time slot of the M time slots, wherein the encoder is configured to determine which data symbol to be transmitted from each antenna in each time slot; and
a receiver for receiving the transmitted data symbols, wherein the receiver uses a sphere decoder to:
calculate $$\overline{S}_j = \min_S \left( \| H_j W^H H_j^{-1} Y_j - H_j B S \|^2 \right)$$

for j=1 to N using modified sphere technique;

$$\text{calculate } \Phi_i = \sum_{j=1}^{N} \| H_j W^H H_j^{-1} Y_j - H_j B \overline{S}_i \|^2$$

for i=1 to N;
find $$\min_i \{\Phi_1, \Phi_2, \ldots, \Phi_N\};$$

and
determine $\hat{S}=\overline{S}_i$, where $H_i$ is an equivalent channel matrix, $Y_i$ is an output vector of ith receive antenna, W is a unitary matrix, U is the unitary matrix, S is a transmitted vector and $\hat{S}$ is the output of the receiver, B=diag($\beta_1$, $\beta_2$, ..., $\beta_n$), where $\beta_1, \beta_2, \ldots \beta_n$ are n numbers that do not satisfy the following equation:

$$a_1\beta_1 + a_2\beta_2 + \ldots + a_n\beta_n = 0 \{a_1, a_2, \ldots, a_n\} \in Q[i].$$

7. The system of claim 6, wherein the receiver includes a Zero Force (ZF) equalizer and is configured to decode the transmitted data without computing a direct inversion of any channel matrix.

8. The system of claim 6, wherein the receiver includes one antenna and a minimum mean squared error (MMSE) equalizer.

9. The system of claim 6, wherein the sphere decoder is configured to decode the transmitted data without a QR decomposition.

10. The system of claim 6, wherein the sphere decoder is configured to compute a Cholesky decomposition matrix to decrease computational complexity.

11. The system of claim 6, wherein the encoder is a member of T matrices family.

* * * * *